INVENTORS.
RALPH A. OLSON
MARVIN E. WOOD
THOMAS J. LANGLEY
BY Hume, Groen, Clement & Hume
ATTORNEYS.

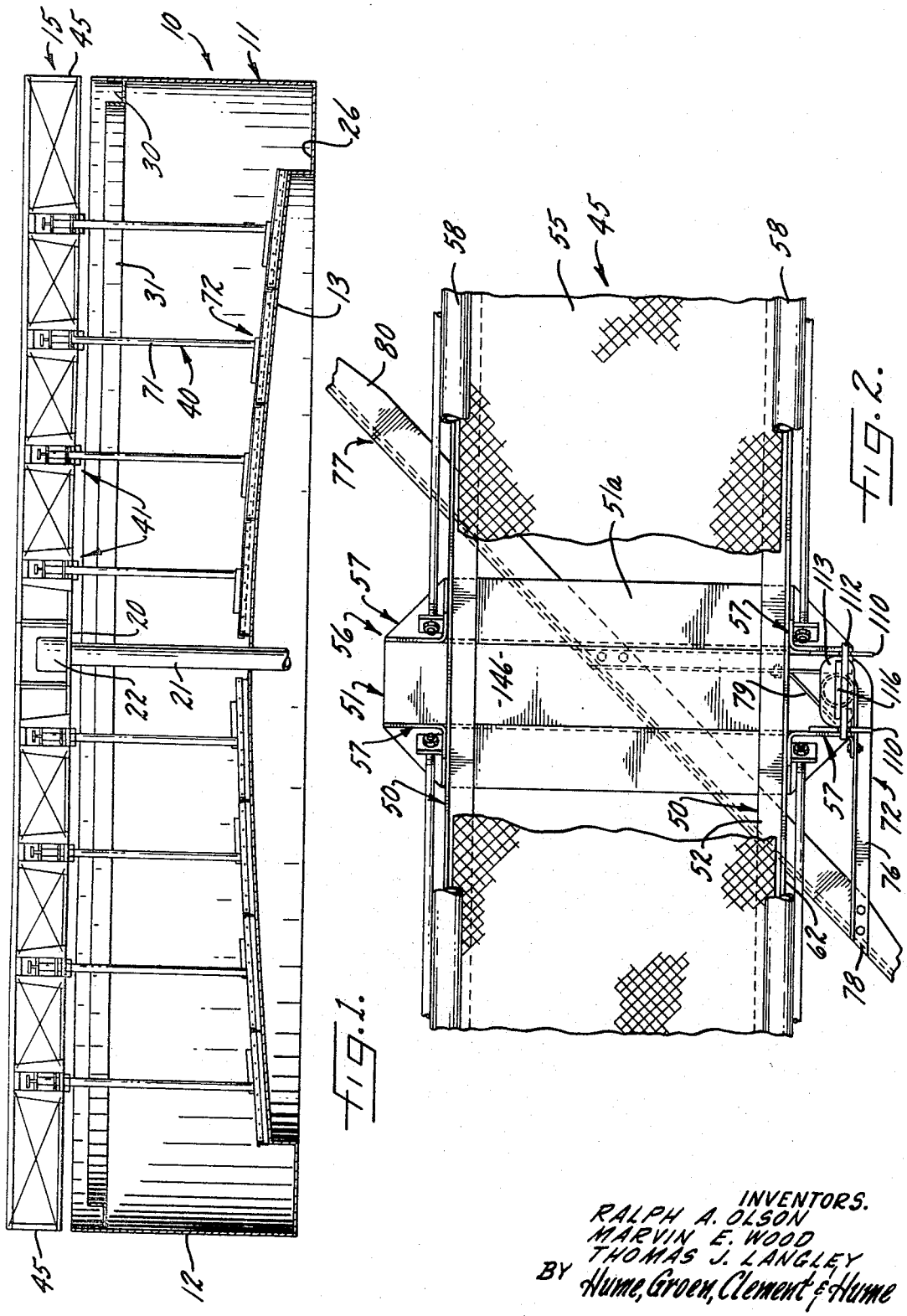

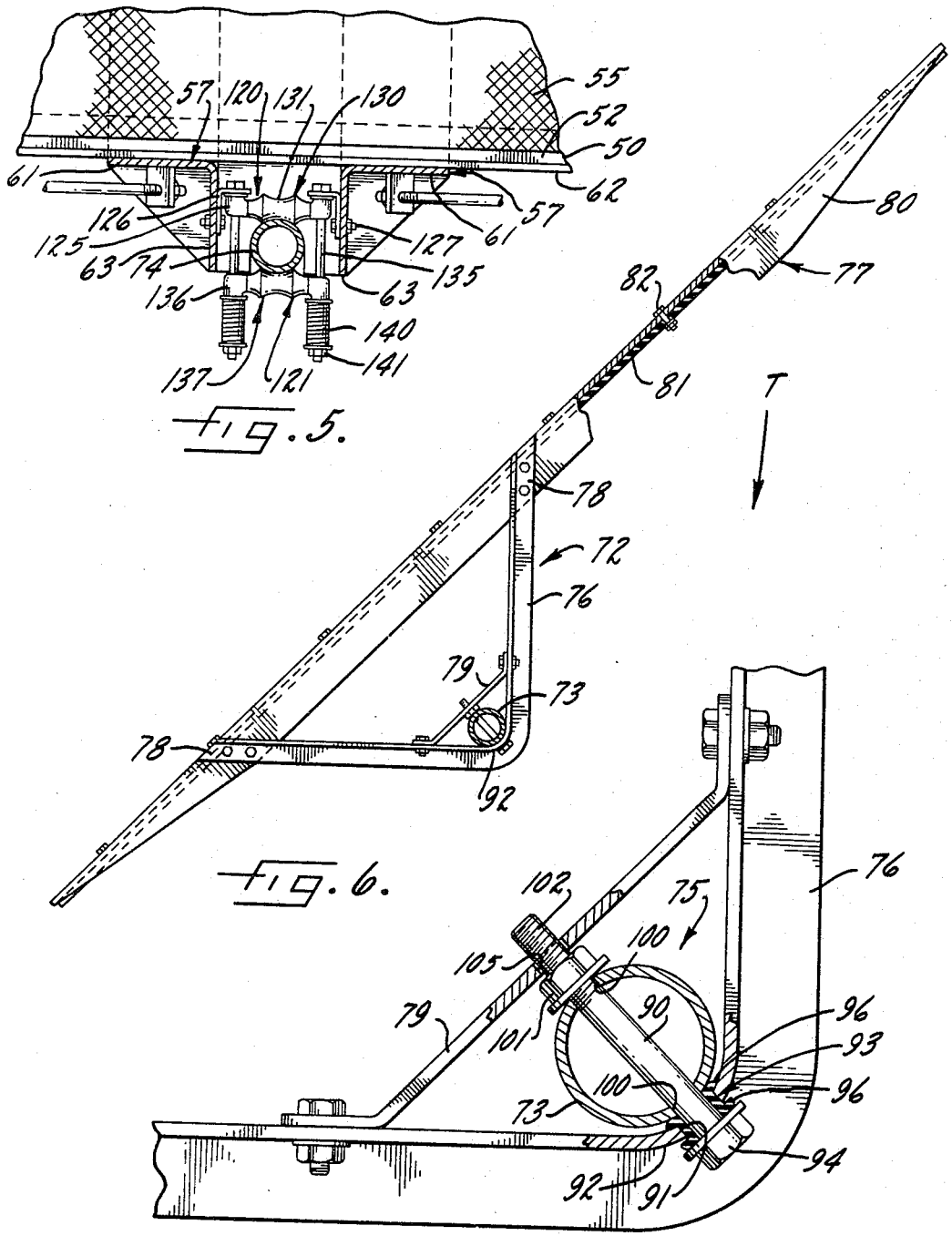

United States Patent Office 3,335,447
Patented Aug. 15, 1967

3,335,447
SEWAGE TREATMENT SYSTEM
Ralph A. Olson, Kansas City, Mo., and Marvin E. Wood, Lawrence, and Thomas J. Langley, Prairie Village, Kans., assignors to Union Tank Car Company, Chicago, Ill., a corporation of New Jersey
Filed Feb. 23, 1965, Ser. No. 434,371
10 Claims. (Cl. 15—246.5)

ABSTRACT OF THE DISCLOSURE

A floor scraper assembly mounted on the rotating bridge of a sewage treatment tank. A drop pipe is suspended from retaining slots on the bridge by a shearable transverse pin and braced against bearing rollers which facilitate raising and pivoting a scraper unit on the lower end of the pipe into accessible relationship. The scraper unit is flexibly mounted on the lower end of the drop pipe to accommodate floor irregularities and the like.

This invention relates in general to sewage treatment and more particularly to a clarifier tank in a sewage treatment system. It deals specifically with the handling of sludge in a sewage treatment clarifier tank.

In the type of sewage treatment system in question, a clarifier tank normally defines one stage in a multi-stage system. The clarifier tank receives a "mixed liquor" from an initial stage aeration tank. Solids are separated from liquid by settling in the clarifier, and the liquid is removed as effluent from the system and disposed of. The settled solids or sludge is preferably removed for use in a subsequent aeration stage of the sewage treatment.

To collect the sludge for removal to the aforementioned subsequent aeration stage, it is conventional to provide a sludge collection trough at either the center of the tank or around the periphery thereof. In the present system the floor slopes downwardly from the center of the tank toward the periphery thereof in a generally conical configuration and the sludge trough is provided around the periphery of the tank. As will be recognized, it is intended that the sludge move outwardly on the slightly conical, inclined floor into the peripheral sludge trough where the sludge is drawn off by suitable means to be transferred to a later stage aeration tank.

It is conventional to assist the movement of sludge either outwardly or inwardly on the clarifier floor, depending upon the location of the collecting trough, by scraping the clarifier floor and sludge accumulated thereon toward the trough. The present invention is concerned with a sludge scraper arrangement for assisting the movement of sludge on the clarifier floor toward the sludge trough.

It is an object of the present invention to provide an improved sludge scraper arrangement for assisting the movement of accumulated sludge on a clarifier floor toward a sludge collection trough.

It is another object to provide a sludge scraper arrangement of the aforedescribed character which incorporates a plurality of new and improved sludge scraper assemblies adapted for mounting on a rotating bridge on the clarifier tank.

It is still another object to provide a scraper assembly which facilitates expeditious manipulation of the scraping unit into and out of operative engagement with the tank floor.

It is yet another object to provide a scraper assembly wherein the scraping unit can move vertically and change its angular orientation relative to its support member to accommodate irregularities and obstructions on the tank floor.

It is a further object to provide a floor scraper assembly which incorporates a safety feature to assure that the assembly is not damaged if the scraper unit encounters a relatively immovable obstruction during rotation of the bridge.

It is yet a further object to provide a floor scraper assembly wherein the scraping unit can easily be elevated to facilitate access for maintenance or the like.

The foregoing and other objects are realized in accord with the present invention by providing a clarifier floor scraper arrangement which includes a series of substantially identical floor scraper assemblies releasibly mounted on a rotating bridge which surmounts the clarifier tank. The scraper assemblies are so constructed that the scraping units follow the clarifier floor regardless of slight irregularities in, or obstructions on the floor, scraping the sludge outwardly toward the peripheral trough of the tank. Each floor scraping unit is individually mounted for quick removal from operational relationship to facilitate maintenance.

The invention, both as to its organization and method of operation, taken with further objects and advantages thereof, will best be understood by reference to the following description taken in connection with the accompanying drawings, in which:

FIGURE 1 is a side elevational view of a sewage treatment clarifier tank, with parts broken away, incorporating a sludge scraper arrangement embodying features of the present invention;

FIGURE 2 is an enlarged plan view of a single scraper assembly and its relationship to the rotating bridge of the clarifier tank, with parts broken away;

FIGURE 5 is a sectional view taken along line 5—5 of FIGURE 3;

FIGURE 6 is a sectional view taken along line 6—6 of FIGURE 3; and

FIGURE 7 is an enlarged sectional view of the portion of the scraping unit circled in FIGURE 6.

Figure 3:
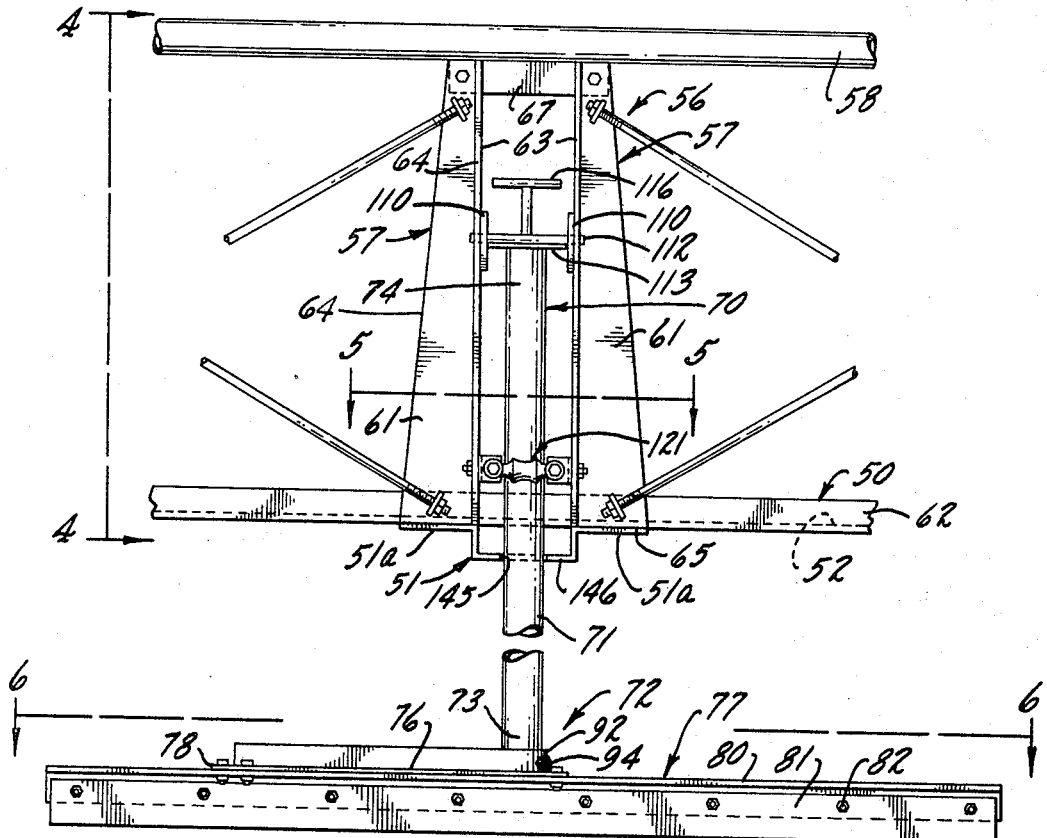
FIGURE 3 is a front elevational view of the scraper assembly and a portion of the rotating bridge.

Referring now to the drawings, and particularly to FIGURE 1, a sewage treatment clarifier is illustrated generally at 10. The clarifier 10 includes a tank 11 having a circular cylindrical outer wall 12 and a rotating bridge 15 mounted above the wall. The rotating bridge 15 includes a central platform section 20 rotatably mounted on the vertically disposed central column 21 extending upwardly from the floor 13 of the tank 11. A conventional electric motor 22 of suitable horsepower mounted on the section 20 is connected to the column 21 in a well-known manner to rotate the section 20 and, accordingly, the bridge 15 about a vertical axis defined by the column.

The tank floor 13 has an outwardly and downwardly sloping surface; what approximates a slightly conical configuration. The floor 13 is preferably concrete laid in place and a sludge trough 26 is formed in the concrete around the periphery of the floor inside the wall 12.

In the sewage treatment system in question, mixed liquor (liquid and some solids after aeration) enters the clarifier 10 through an inlet (not shown) in the column 21 in a well-known manner. Solids in the liquor settle to form sludge on the floor 13 while effluent passes into a trough 30 over an effluent weir 31 extending around the inside of the tank wall 12 adjacent its upper edge. The effluent is removed from the trough 30 and disposed of in a well-known manner. At the same time, the sludge which settles to the floor 13 has a tendency to move toward the outer periphery of the floor and into the sludge trough 26 because of the floor's slightly conical configuration.

To assist the radially outward movement of sludge toward the peripheral sludge trough 26, a sludge scraper arrangement 40 is mounted for rotation with the rotating bridge 15 and "plows" the sludge outwardly on the tank floor 13. The sludge scraper arrangement 40 embodies features of the present invention and includes a series of identical sludge scraper assemblies 41 mounted on the wing sections 45 of the bridge 15 and depending therefrom. The scraper assemblies cooperate to successively plow sludge outwardly toward the sludge trough 26.

Figure 4:
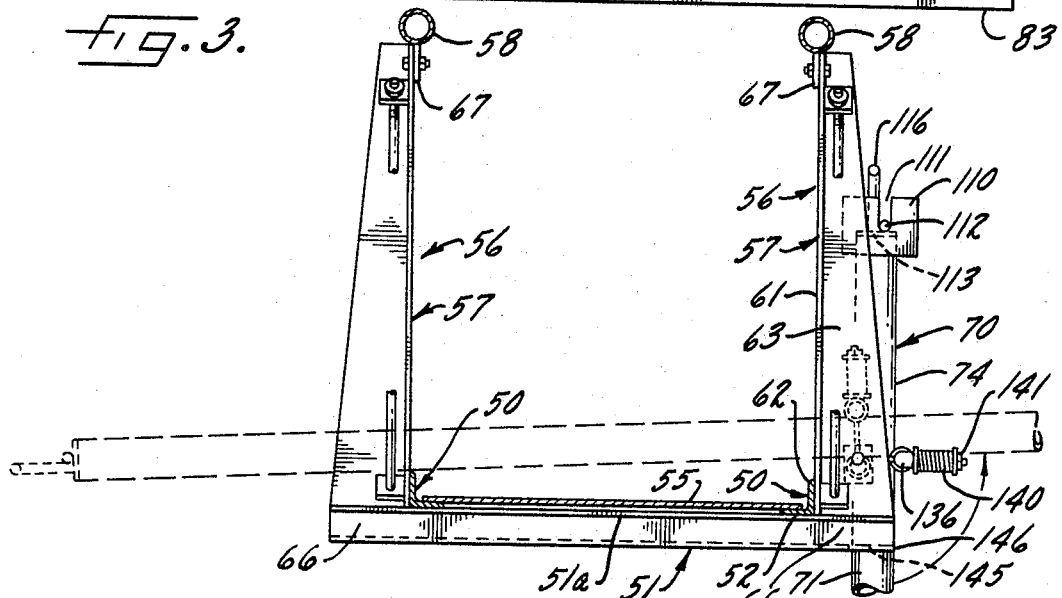
FIGURE 4 is a side elevational view of the scraper assembly and a portion of the rotating bridge.

Turning now to FIGURES 2–5, it will be seen that each wing section 45 of the rotating bridge 15 comprises a pair of angle iron stringers 50 interconnected by cross braces (only one shown) secured to the horizontal flanges 52 of the stringers by welding or the like. Each cross brace 51 is a channel member having outwardly extending flanges 51a formed on opposite sides thereof. A corrugated bridge deck 55 overlies the horizontal flanges 52 of the angle iron stringers 50 and is secured thereto by welding.

Mounted above each angle iron stringer 50 on spaced pairs 56 of mounting stanchions 57 are handrails 58. The stanchions 57 in each pair 56 are identical, although mirror images of each other. Each stanchion 57 is actually an angle member having one flange 61 secured to the vertical flange 62 of a stringer 50, and the other flange 63 extending perpendicular thereto. The free edges 64 of the flanges 61, 63 converge upwardly, as will be noted while the lower edge 65 of each flange 63 is welded to a corresponding cantilever section 66 of the braces 51. Short straps 67 are welded to and interconnect the upper ends of the stanchions 57 in each pair 56 and the handrails 58 are actually bolted to the upper edges of the straps 67.

As the bridge 15 rotates, one of the angle iron stringers 50 in each bridge wing section 45 defines the leading edge of the bridge. It is along the leading edge stringer 50 of each wing section 45 that sludge scraper assemblies 41 are mounted between corresponding pairs of stanchions 57 with mounting assemblies 70. Although there might be eight or more of these assemblies 41, only one is shown and described in detail since they are identical.

A scraper assembly includes a drop pipe 71 having a scraping unit 72 secured to its lower end 73 for travel in scraping relationship on the tank floor 13 to sweep sludge outwardly into the trough 26. Each mounting assembly 70 releasably secures the upper end 74 of the drop pipe 71 to a corresponding bridge with 45.

The scraping unit 72 is secured to the lower end 73 of the pipe 71 by a connector assembly 75 and comprises a V-shaped angle iron member 76 secured to a scraper blade 77. The blade 77 is inclined at approximately a 45° angle to the direction of travel T of the corresponding bridge wing 45 and is secured to the free ends 78 of the angle iron member 76 by conventional machine bolts. A brace strap 79 connects the legs of the angle iron member 76 to stiffen it.

The scraper blade 77 comprises an elongated angle bracket 80 to which a depending strip 81 of flexible belt material or the like is attached by bolts 82 (shown diagrammatically). The lower edge 83 of the strip 81 engages the floor 13 of the clarifier tank 11 and scrapes the sludge accumulated thereon outwardly towards the trough 26 as the bridge 15 rotates. It should be understood, of course, that the inclined blades 77 of each scraper assembly 41 on a corresponding bridge wing 45 "overlap" radially of the bridge and, accordingly, successively force the sludge outwardly toward the trough 26.

The flexibility of the strip 81 accommodates slight obstructions on, or irregularities in, the floor 13 of the clarifier tank 11, of course. Larger obstructions such as small hand tools or the like inadvertently dropped in the tank 11 present a more serious problem, however. They tend to force the blade 77 upwardly or to cock it at a different angle to the pipe 71. According to the present invention, the connector assembly 75 accommodates this blade movement without an untoward effect on the pipe 71, mounting assembly 70, or connector assembly 75, as well as the blade itself.

The connector assembly 75 comprises a conventional three-quarter inch machine bolt 90 extending through a circular aperture 91 of substantially greater diameter formed in the curved flange portion 92 of the angle iron member 76. A rubber grommet 93 preferably encircles the machine bolt 90 adjacent its head 94 and extends snugly through the aperture 91 so that its enlarged heads 96 are disposed on opposite sides of the curved flange portion 92.

The bolt 90 extends snugly through apertures 100 in the lower end 73 of the drop pipe 71 and a conventional nut 101 is threaded onto the end 102 of the bolt 90. The nut 101 is drawn up against the lower end 73 of the pipe 71 to secure it firmly against the corresponding head 96 of the grommet 93. The extending free end 102 of the bolt 90 passes loosely through a vertically elongated slot 105 in the bracing strap 79.

As the scraping unit 72 encounters obstructions on the floor 13 of the clarifier tank 11 and is thrust upwardly or twisted by them, for example, this movement is accommodated by almost universal pivoting of the angle iron member 76 about the bolt 90 on the grommet 93 and travel of the bolt in the vertical slot 105 through the brace 79. The angle iron member 74 can also rise and fall relative to the bolt by compressing the grommet 93. As a result, the scraping unit 72 effectively scrapes without incurring or causing damage to the scraper assembly 41 when the blade 77 encounters irregularities or obstructions on the clarifier floor 13. Should a particularly difficult obstruction be encountered by the scraper blade 77, the mounting assembly for the drop pipe 71 is designed, according to the present invention, to release the pipe without damage to the bridge 15, the mounting assembly 70 itself, or the scraper assembly 41.

The mounting assembly 70 comprises a pair of ears 110 welded to and extending forwardly of the flanges 63 on a pair 56 of stanchions 57. The ears 110 have vertically extending slots 111 formed in their upper edges for receiving a shear pin 112 welded in transverse relationship on a cover plate 113 secured over the open upper end of the pipe 71 by welding. A T-shaped lift handle 116 is welded to and extends upwardly from the plate 113. By gripping the handle 116 the pipe 71 can be lifted into or out of the supporting slots 111 in the ears 110.

In suspension from the ears 110, the drop pipe 71 extends between a pair of pipe roller units 120 and 121 mounted between the outwardly extending flanges 63 of the stanchions 57 immediately above the bridge deck 55. The inner pipe roller unit 120 includes a pair of elbows pivotally secured to corresponding flanges 73 by L-straps 126 and pins 127. A pipe roller 130 of conventional construction is rotatably mounted between the elbows 125 in a well-known manner. The pipe 71 is braced against the cylindro-concave surface 131 of the roller 130.

The outer pipe roller unit 121 is spring loaded against the pipe 71 on slide rods 135 extending from the elbows 125 and urges the pipe 71 into engagement with the roller 130. The outer pipe roller unit 121 includes mounting elbows 136 slidably mounted on the rods 135 and a roller 137 identical to the roller 130 rotatably mounted between the elbows 136. Coil springs 140 encircling the rods 135 between the elbows 136 and retaining nuts 141 on the ends of the rods urge the roller 137 and the pipe 71, into engagement with the roller 130.

From the pipe roller units 120 and 121 the drop pipe extends downwardly through a suitably formed cutout 145 in the base 146 of the channel 51 on the bridge wing 45 to the scraping unit 72.

It will now be seen that the pipe 71 and depending scraping unit 72 are firmly mounted in operational position when the shear pin 112 is seated in the slots 111 of supporting ears 110. When it is desirable to remove an individual scraping unit 72 from operational position for maintenance or the like, the operator or the bridge 15 merely pulls upwardly on the T-handle 116 to lift the shear pin 112 out of the slots 111. The scraper drop pipe 67 is then twisted 90° about its own axis, turning the scraping unit 72 also, of course, and the pipe 71 pivoted about the mounting bolts 127 for the pipe roller units 120 and 121 to bring the pipe 71 into dotted line relationship in FIGURE 4. The bracing strap 79 of the scraping unit 72 supports the free end of the bolt 90 in the slot 105 and, accordingly, stabilizes the unit.

We claim:

1. In a sewage treatment tank wherein sludge is deposited on the tank floor and travelling means are mounted above the floor for rotation about a vertical axis, the improvement in floor scraper assembly for scraping the sludge on the floor toward a sludge trough, comprising: a scraping unit mounted on support means extending upwardly from said unit, a mounting assembly for securing said support means to the travelling means, said mounting assembly including structural means defining vertically disposed slot means on one of said support means and said travelling means, shear pin means secured to the other of said support means and said travelling means and seated in said slot means, and bearing means below said slot means against which said support means bears as the travelling means rotates and said scraping unit scrapes sludge on the tank floor toward the sludge trough, said shear pin means being of predetermined strength calculated to fail when said scraping unit encounters excessive resistance as it scrapes sludge on the tank floor.

2. The improvement in floor scraper assembly of claim 1 further characterized in that said support means comprises a drop pipe, said bearing means including one bearing roller against which said drop pipe bears as the travelling means rotates and said scraping unit scrapes sludge on the tank floor, said bearing means being mounted to facilitate pivoting of said drop pipe about a horizontal axis whereby said scraping unit can be levered upwardly from the floor of the tank for maintenance or the like by drawing said retainer means out of said slot means and pivoting said drop pipe on said bearing roller.

3. The improvement in floor scraper assembly of claim 2 further characterized in that said bearing means includes another bearing roller spring loaded against said drop pipe to urge said drop pipe into bearing engagement with said one bearing roller.

4. In a sewage treatment tank wherein sludge is deposited on the tank floor and traveling means are mounted above the floor for rotation about a vertical axis, the improvement in floor scraper assembly for scraping the sludge on the floor toward a sludge trough, comprising: a scraping unit mounted on support means extending upwardly from said unit, a mounting assembly for securing said support means to the travelling means, said mounting assembly including structural mounting means, retainer means secured to said support means in transversely extending relationship and seated in said mounting means to support said support means and scraping unit and bearing means below said mounting means against which said support means bears as the travelling means rotates and said scraping unit scrapes sludge on the tank floor toward the sludge trough, said scraping unit being mounted on said support means for vertical movement relative thereto to accommodate irregularities in and obstructions on the floor.

5. In a sewage treatment tank wherein sludge is deposited on the tank floor and travelling means are mounted above the floor for rotation about a vertical axis, the improvement in floor scraper assembly for scraping the sludge on the floor toward a sludge trough, comprising: a scraping unit, support means extending upwardly from said unit, connector means flexibly mounting said scraping unit on said support means, and a mounting assembly for securing said support means to the travelling means, said connector means permitting vertical movement of said scraping unit relative to said support means to accommodate irregularities in and obstructions on the tank floor as the travelling means rotates and said scraping unit scrapes sludge on the tank floor toward the sludge trough.

6. The improvement in floor scraper assembly of claim 5 further characterized in that said scraping unit includes a mounting bracket having scraper blade means secured thereto, said support means including a drop pipe, said connector means including a connector pin extending loosely through an aperture in said bracket and secured to the lower end of said drop pipe.

7. The improvement in floor scraper assembly of claim 6 further characterized in that said connector means includes a resilient grommet encircling said pin and extending through said aperture, said aperture diameter being substantially larger than the thickness of said pin, whereby said bracket and said blade means are permitted a predetermined degree of universal movement about said aperture on said grommet.

8. The improvement in floor scraper assembly of claim 7 further characterized by and including a vertically extending slot formed in said bracket, said pin extending through said slot, the dimensions of said slot defining the extent of movement of said bracket and said blade means about said aperture.

9. In a sewage treatment tank wherein sludge is deposited on the tank floor and a travelling bridge is mounted above the floor for rotation about a vertical axis, the improvement in floor scraper assembly for scraping the sludge on the floor toward a sludge trough comprising: a scraping unit, connector means mounting said scraping unit on a drop pipe extending upwardly from said unit, a mounting assembly including slot means for securing said drop pipe to the bridge, retainer means secured to said drop pipe in transversely extending relationship and seated in said slot means to support said drop pipe and scraping unit, bearing means below said slot means against which said drop pipe bears as the bridge rotates and said scraping unit scrapes sludge on the tank floor toward the sludge trough, said connector means including resilient means permitting vertical movement of said scraping unit relative to said drop pipe and limited universal pivoting movement of said scraping means relative to said drop pipe to accommodate irregularities in and obstructions on the tank floor.

10. The improvement in floor scraper assembly of claim 9 further characterized in that said bearing means is mounted for pivotal movement about a horizontal axis whereby said scraping unit can be levered upwardly from the floor of the tank for maintenance or the like by drawing said retainer means out of said slot means and pivoting said pipe on said bearing means pivot axis.

References Cited

UNITED STATES PATENTS 3,156,939  11/1964  Nimke et al. _____ 15—246.5

CHARLES A. WILLMUTH, *Primary Examiner.*

L. G. MACHLIN, *Assistant Examiner.*